United States Patent
Joo et al.

(10) Patent No.: US 8,023,043 B2
(45) Date of Patent: Sep. 20, 2011

(54) DEVICE FOR UPDATING COMPONENT OF APPLICATION SOFTWARE IN DIGITAL BROADCASTING SIGNAL RECEIVER AND METHOD THEREOF

(75) Inventors: Jae-gon Joo, Gunpo-si (KR); Hyun-chul Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1010 days.

(21) Appl. No.: 11/224,143

(22) Filed: Sep. 13, 2005

(65) Prior Publication Data

US 2006/0150217 A1 Jul. 6, 2006

(30) Foreign Application Priority Data

Jan. 6, 2005 (KR) .................. 10-2005-0001095

(51) Int. Cl.
*H04N 5/44* (2011.01)
(52) U.S. Cl. ........... 348/553; 348/558; 348/714; 725/50
(58) Field of Classification Search .................. 348/725, 348/727, 734, 553–555, 460–461, 465, 467, 348/10–13, 714–716, 558; 725/132, 140, 725/152, 50, 44, 39; 455/6.2, 6.3, 5.1, 4.2; *H04N 5/44*
See application file for complete search history.

(56) References Cited

U.S. PATENT DOCUMENTS

| | | | | |
|---|---|---|---|---|
| 5,619,250 A | * | 4/1997 | McClellan et al. | 725/132 |
| 5,754,651 A | * | 5/1998 | Blatter et al. | 380/241 |
| 6,331,876 B1 | * | 12/2001 | Koster et al. | 348/725 |
| 7,051,325 B2 | * | 5/2006 | Choi et al. | 717/168 |
| 7,075,899 B2 | * | 7/2006 | Sheehan et al. | 370/257 |

FOREIGN PATENT DOCUMENTS

| | | |
|---|---|---|
| JP | 2004-78728 A | 3/2004 |
| KR | 10-2001-0038584 A | 5/2001 |
| KR | 10-2004-0066611 A | 7/2004 |

* cited by examiner

*Primary Examiner* — Trang U Tran
(74) *Attorney, Agent, or Firm* — Sughrue Mion, PLLC

(57) ABSTRACT

A device for updating component of application software in a digital broadcasting signal receiver and a method thereof. A storage section stores executing data for executing application software that produces a user interface of the digital signal receiver. A program specific information/service information extracting section extracts program specific information/service information (PSI/SI) from a received digital broadcasting signal. An updating data extracting section extracts updating information for partially updating the application software from the program specific information/service information, and extracts updating data for updating the application software from the digital broadcasting signal according to the updating information in order to update the executing data stored in the storage section to the extracted updating data. An application software section updates and executes the application software according the updated executing data. Therefore, time and resources required to update application software are saved.

13 Claims, 2 Drawing Sheets

DEVICE FOR UPDATING COMPONENT OF APPLICATION SOFTWARE IN DIGITAL BROADCASTING SIGNAL RECEIVER AND METHOD THEREOF

CROSS-REFERENCE TO RELATED APPLICATIONS

This application claims benefit under 35 U.S.C. §119 from Korean Patent Application No. 2005-1095, filed on Jan. 6, 2005, the entire content of which is incorporated herein by reference.

BACKGROUND OF THE INVENTION

1. Field of the Invention

The present invention relates to a device for updating a component of application software in a digital broadcasting signal receiver and a method thereof, and more particularly, to a device for updating a component of an application software for operating a digital broadcasting signal receiver based on a digital broadcasting signal being transmitted and a method thereof.

2. Description of the Related Art

Digital broadcasting signal receivers receive a digital broadcast transmitted according to a digital video broadcasting (DVB) standard, the European broadcasting standard, and an American Television Systems Committee (ATSC) standard, the American digital broadcasting standard, and provide a digital image of high definition.

Currently, in addition to a basic function of receiving a digital broadcasting signal and providing images of high definition by a digital broadcasting signal receiver, a technology has been developed to provide various functions, such as providing broadcasting information with respect to various channels, and providing a user interface for selecting and using additional functions and for performing bilateral communication.

Accordingly, the digital broadcasting signal receiver displays and selects various functions to be provided to a user. The digital broadcasting signal receiver has application software for controlling and operating the digital broadcasting signal receiver in order to embody various functions provided by the digital broadcasting signal receiver.

In general, upon manufacturing the digital broadcasting signal receiver, the application software for operating the digital broadcasting signal receiver is installed on the digital broadcasting signal receiver. However, when the application software is needed according to a change of a broadcasting environment, in order to update the application software for operating the digital broadcasting signal receiver, a technology of adding necessary data and information to the digital broadcasting signal and performing a broadcasting based upon it, has been suggested.

According to such a technology, the application software is compressed or original software is inserted into a predetermined position separately from the typical data of the digital broadcasting signal, and is then transmitted.

However, the application software has various and wide structural elements such as image information, audio information, character information, games, and application program data. Time and costs required to transmit data for updating the entire application software and to update the entire application software according to the transmitted data, are accordingly increased.

SUMMARY OF THE INVENTION

Accordingly, it is an aspect of the present invention to provide a device for updating a component of application software in a digital broadcasting signal receiver and a method thereof, which partially update the application software for operating the digital broadcasting signal receiver according to a digital television (DTV) broadcasting environment.

The above aspect of the present invention is substantially realized by providing a device for updating a component of application software in a digital broadcasting signal receiver, including a storage section for storing executing data for executing application software that produces a user interface of the digital signal receiver; a program specific information/service information extracting section for extracting program specific information/service information (PSI/SI) from a received digital broadcasting signal; a updating data extracting section for extracting updating information for partially updating the application software from the program specific information/service information, and for extracting updating data for updating the application software from the digital broadcasting signal according to the updating information in order to update the executing data stored in the storage section; and an application software section for updating and executing the application software according the updated executing data.

In an exemplary embodiment, the updating information may include type information corresponding to a kind of the updating data among respective structural elements of the executing data.

In an exemplary embodiment, the updating data extracting section may extract the updating data corresponding to the type information, and updates parts corresponding to the type information among the executing data.

In an exemplary embodiment, the updating data are data according to a digital storage media-command and control (DSM-CC) protocol.

In accordance with another aspect of the present invention, there is provided a method for updating a component of application software in a digital broadcasting signal receiver, and the method includes the steps of: extracting program specific information/service information (PSI/SI) from a received digital broadcasting signal; extracting updating information for partially updating the application software from the program specific information/service information, and for extracting updating data for updating the application software from the digital broadcasting signal according to the updating information in order to update the executing data stored in the storage section to the extracted updating data; and updating and executing the application software according the updated executing data.

In an exemplary embodiment, the updating information may include type information corresponding to a kind of the updating data among respective structural elements of the executing data.

In an exemplary embodiment, the type information may include at least one of an image, a sound, a game, a character, and software.

Accordingly, the application software of the digital broadcasting signal receiver can be partially updated, thereby causing required time and resources to update application software to be saved, and providing convenience to a user.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

The present invention will now be described with reference to the accompanying drawings, in which exemplary embodiments of the invention are shown. The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements.

Figure 1:
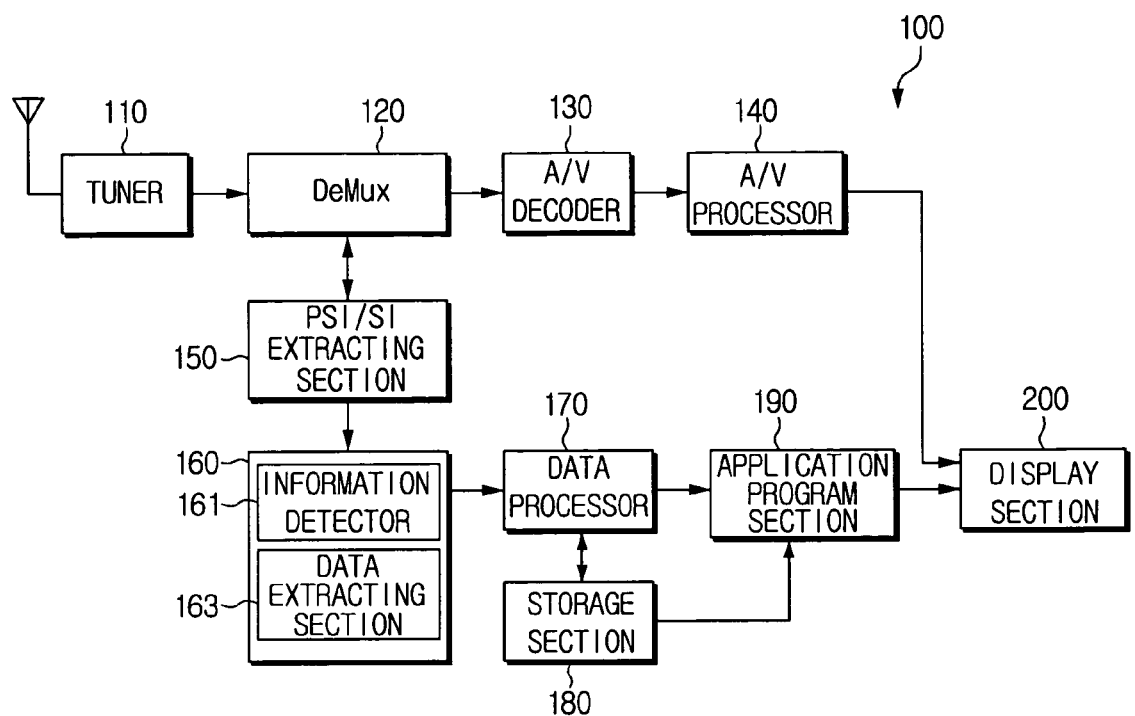
FIG. 1 is a block diagram showing a device for updating component of application software in a digital broadcasting signal receiver according to an exemplary embodiment of the present invention.

FIG. 1 is a block diagram showing a device for updating component of application software in a digital broadcasting signal receiver according to an exemplary embodiment of the present invention.

With reference to FIG. 1, a digital broadcasting signal receiver 100 includes a tuner 110, a demultiplexer (referred to as "DeMUX", hereafter) 120, an audio/video (referred to as "AV", hereafter) decoder 130, an AV processor 140, a program specific information/service information (referred to as "PSI/SI", hereafter) extracting section 150, a digital storage media (referred to as "DSM", hereafter) data detector 160, a data processor 170, a storage section 180, an application program section 190, and a display section 200.

FIG. 1 is a view schematically showing a digital broadcasting signal receiver 100 having blocks related to an operation of a device for updating component of application software according to an exemplary embodiment of the present invention, but details thereof are omitted.

The tuner 110 selects a desired channel among a plurality of channels received through an antenna. Signals are received through the selected channel in a transport stream. The transport stream includes not only a digital broadcasting signal but also PSI/SI and additional data.

The transport stream further includes data (referred to as "updating data", hereafter) for updating structural elements of a user interface of application software in the digital broadcasting signal receiver using a digital storage media-command and control (referred to as "DSM-CC", hereafter) protocol.

The DSM-CC protocol is a protocol that defines control functions and operation functions for handling MPEG-1 and MPEG-2 bit streams so that a general application program and a script application program can access streams and data.

That is, the DSM-CC protocol defines a selection of the transport stream, functions and interfaces regarding stream control, storage, and management. The DSM-CC protocol is used for an interactive multi-media service applicable to a video-on demand (VOD), games, and electronic shopping; and communication of audio/video data stored through various kinds of computer networks. Digital Audio-Visual Council (DAVC) is now using the DSM-CC protocol as a protocol for an application software control.

According to the present invention, all kinds of data having audio and video data for application software in the digital broadcasting signal receiver 100 are inserted into a transport stream, and then transmitted. The digital broadcasting signal receiver 100 detects data for updating the application software from the transport stream according to the DSM-CC protocol, and updates the application software using the updated data.

On the other hand, the PSI/SI has information for individual and multiple programs included in the transport stream. Namely, the PSI is data that are repeatedly transmitted through the transport stream at predetermined intervals, and consists of a table structure divided by sections. The PSI includes program association table (PAT) information, program map table (PMT) information, conditional access table (CAT) information, and transport stream description table (TSDT) information.

The SI includes network information table (NIT) information, bouquet association table (BAT) information, service description table (SDT), and event Information table (EIT) information.

In an exemplary embodiment of the present invention, the updating information is included in the PSI/SI table wherein the updating information has types of structural elements included in the updating data for updating structural elements of the application software, and insertion position information of the updating data. Accordingly, by parsing the PSI/SI table to interpret updating information, types of the structural elements of the application software and the insertion position information of the updating data, are obtained.

The DeMUX 120 demultiplexes a transport stream of the channel by characteristics, selected by the tuner 110. That is, the DeMUX 120 separates a digital broadcasting signal from the received transport stream, and provides the separated digital broadcasting signal to a broadcasting signal decoder 130. The DeMUX 120 also separates additional data having the PSI/SI, and all signals except audio and video signals from the transport stream, and provides the separated data and signals to a PSI/SI extracting section 150 to be described below.

PSI/SI extracting section 150 extracts the PSI/SI from the demultiplexed data inputted from the DeMUX 120, and outputs the extracted PSI/SI, and all the signals except audio and video signals to an updating data extracting section 160.

The updating data extracting section 160 detects and interprets updating information inserted in a predetermined position from the PSI/SI, and extracts the updating data inserted in the transport stream accordingly. In order to perform the operation, the updating data extracting section 160 includes an information detector 161 and a data extracting section 163.

The information detector 161 parses the PSI/SI to analyze a PSI/SI table ID, interprets table information having updating information of the broadcasting signal receiver to detect a type of the updating data. For example, there are images, audios, games, and characters as a type of the updating data. Furthermore, the information detector 161 detects whether or not position information of the updating data is included in the updating information. When the position information of the updating data is included in the updating information, the information detector 161 provides the detected location information of the updating data to a data extracting section 163.

The data extracting section 163 extracts the updating data from the transport stream in which the updating data are inserted according to the updating information from the information detector 161, and judges whether or not the extracted updating data are valid. According to the DSM-CC, the updating data are divided into predetermined units as the data can be inserted into assigned position, and are then transmitted in order. After the division data, i.e., the divided updating data, of the predetermined units are all transmitted, the transmitted division data are again transmitted in order from the beginning.

Accordingly, when the transmitted updating data are invalid, the data extracting section 163 extracts next transmitted division data for a predetermined time to extract all the divided data.

The data processor 170 receives all division data of the updating data, processes necessary data according a data status having a compression status of data, and recombines the updating data. For example, in a case where a type of the updating data is an image, when division data are compressed, the compression is released, and respective division data are combined to restore the original data, thereby producing image data.

The data processor 170 updates the original data using the recombined updating data, and stores the updated data in a storage section 180, and informs an application software section 190 that the updating data have been produced.

The storage section 180 stores all kinds of data for operating the application software section 190. Namely, the storage section 180 stores executing data such as images, sounds, games, characters, and application programs (software). The storage section 180 further stores a program for operating a digital broadcasting signal receiver according to all kinds of functions of the digital broadcasting signal receiver.

The application program section 190 produces a user interface for selecting and operating all sorts of functions of the digital broadcasting signal receiver according to the data stored in the storage section 180, and outputs the produced user interface to a display section 200. In particular, the data processor 170 informs the application software section 190 that the updating data have been produced, the application program section 190 updates the user interface according to the updating data stored in the storage section 180.

The display section 200 displays images and sounds decoded by the broadcasting signal decoder 130, or the user interface produced by the application program section 190 for operating all sorts of functions of the digital broadcasting signal receiver.

Figure 2:
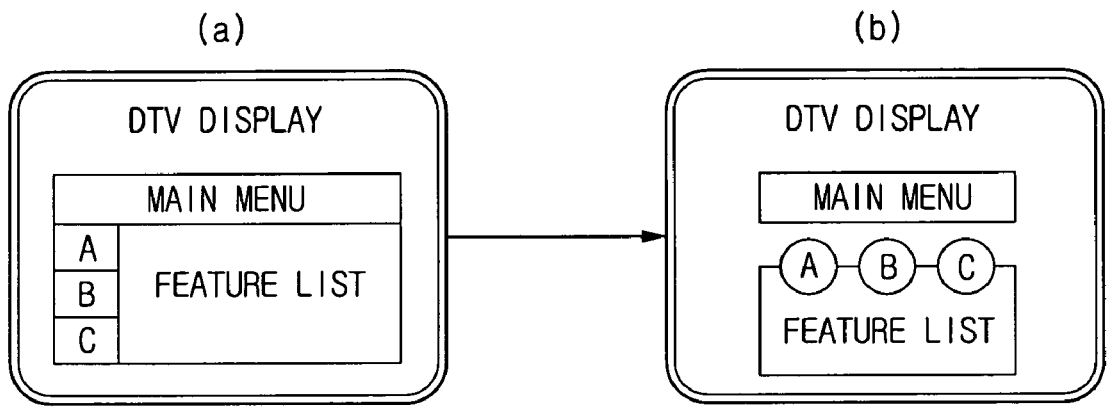
FIG. 2 is a view for explaining a method for updating component of application software in a digital broadcasting signal receiver according to an exemplary embodiment of the present invention.

FIG. 2 shows an example of a screen for selecting functions that are displayed on the display section 200 by the user interface.

Here, a type of the updating data is an image. In FIG. 2, (a) indicates a screen for selecting functions prior to the updating operation. In contrast to this, (b) indicates a screen updated by the application program section 190 according to received updating data.

Referring to FIG. 2, (a) and (b) show the same functions and characters provided by an application program, it is known that only images of forming a screen for a function selection are updated.

Figure 3:
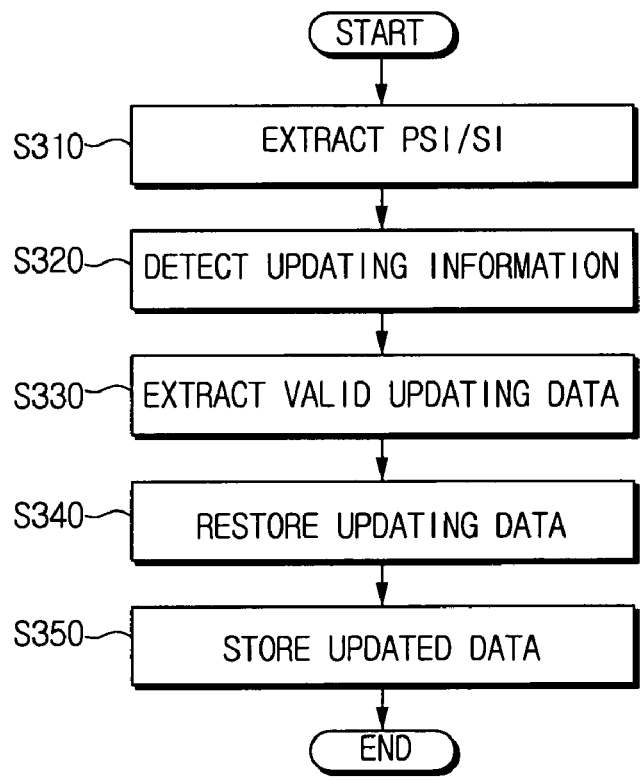
FIG. 3 is flow chart that illustrates a method for updating component of application software in a digital broadcasting signal receiver according to an exemplary embodiment of the present invention.

FIG. 3 is a flow chart illustrating a method for updating component of application software in a digital broadcasting signal receiver according to an exemplary embodiment of the present invention.

With reference to FIG. 3, when the digital broadcasting signal receiver 100 receives the digital broadcasting signal, the tuner 110 selects a desired channel from the received digital broadcasting signal, and the DeMUX 120 demultiplexes a transport stream of the channel by characteristics, selected by the tuner 110.

That is, the DeMUX 120 demultiplexes a transport stream received through the selected channel to a digital broadcasting signal, PSI/SI, and additional data.

A PSI/SI extracting section 150 extracts the PSI/SI from the demultiplexed data inputted from the DeMUX 120 (S310), and provides the extracted PSI/SI, and all the signals except audio and video signals to an updating data extracting section 160.

Accordingly, the information detector 161 of the updating extracting section 160 parses the PSI/SI, and detects types of structural elements included in the updating data according to a DSM-CC protocol, and updating information having insertion position information of the updating data (S320).

Next, the data extracting section 163 extracts valid updating data according to the DSM-CC protocol from the demultiplexed data according to the updating information (S330). In order to do this, the data extracting section 163 extracts respective division data of the updating data, and tests whether or not the respective extracted division data are valid. When the respective extracted division data are invalid, the data extracting section 163 continues to extract the division data of the updating data for a predetermined time period until valid data are extracted.

The data extracting section 163 outputs all extracted valid division data of the updating data to the data processor 170. The data processor 170 processes necessary data according a data status having a compression status of data, and recombines the updating data, thereby restoring the original data (S340).

Thereafter, the data processor 170 stores recombined and updated data in the storage section 180, wherein the previous data for an operation of the application program section 190 have been stored in the storage section 170. Then, the data processor 179 informs the application program section 190 that the updated data have been produced (S350).

As a result, the application program section 190 produces a user interface in which the structural elements corresponding to the stored updating data in the storage section 180 are updated, and outputs the produced user interface to the display section 200. Thus, the application program according to the DSM-CC protocol can be partially updated.

Furthermore, the present invention does not necessarily update the entire application software, but can partially update only the structural elements of the application software changed according to a broadcasting environment variation. Thus, a cost necessary to transmit updating data, and time and resources necessary to update data are saved.

As mentioned above, in the device for updating component of application software in digital broadcasting signal receiver and the method thereof according to the present invention, parts of structural elements in the application software are added to a digital transport stream according to a DSM-CC protocol, and then the digital transport stream is transmitted. Using the digital transport stream, the application software of the digital broadcasting signal receiver can be partially updated, thereby time and resources required to update application software are saved, and providing convenience to a user.

Furthermore, since the application software for operating the digital broadcasting signal receiver is automatically and partially updated according to DTV broadcasting environment variations, the present invention may meet a changed broadcasting environment.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A device for updating a component of application software in a digital broadcasting signal receiver, comprising:
    a storage section configured for storing executing data comprising a first plurality of structural elements for executing an application software that produces a user interface of the digital broadcasting signal receiver;
    a program specific information/service information extracting section configured for extracting program specific information/service information (PSI/SI) from a received digital broadcasting signal;
    an updating data extracting section configured for extracting an updating information for partially updating the first plurality of structural elements of the executing data from the PSI/SI, and for extracting an updating data for updating the application software from the received digital broadcasting signal according to the updating information in order to update a second plurality of the first plurality of structural elements of the executing data stored in the storage section to generate updated executing data, wherein the second plurality is less than the first plurality; and
    an application software section configured for updating and executing the application software according to the updated executing data,
    wherein the updating data are data according to a digital storage media-command and a control (DSM-CC) protocol, and
    wherein the updating information includes an insertion position information of the updating data in the received digital broadcasting signal.

2. The device as claimed in claim 1, wherein the updating information includes a type information corresponding to a kind of the updating data among the respective structural elements of the executing data.

3. The device as claimed in claim 2, wherein the updating data extracting section extracts the updating data corresponding to the type information, and updates parts corresponding to the type information among the executing data.

4. The device as claimed in claim 1, wherein the updating data are divided into predetermined units and inserted into assigned positions before being transmitted in order.

5. A method for updating a component of application software in a digital broadcasting signal receiver, the method comprising:
    storing executing data comprising a first plurality of structural elements for executing an application software that produces a user interface of the digital broadcasting signal receiver;
    extracting program specific information/service information (PSI/SI) from a received digital broadcasting signal;
    extracting an updating information for partially updating the first plurality of structural elements of the executing data from the PSI/SI, and for extracting an updating data for updating the application software from the received digital broadcasting signal according to the updating information in order to update a second plurality of the first plurality of structural elements of the stored executing data to generate updated executing data, wherein the second plurality is less than the first plurality; and
    updating and executing the application software according to the updated executing data,
    wherein the updating data are data according to a digital storage media-command and a control (DSM-CC) protocol, and
    wherein the updating information includes an insertion position information of the updating data in the received digital broadcasting signal.

6. The method as claimed in claim 5, wherein the updating information includes a type information corresponding to a kind of the updating data among the respective structural elements of the executing data.

7. The method as claimed in claim 6, wherein the type information includes at least one of an image, a sound, a game, a character, and a software.

8. The method as claimed in claim 5, wherein the updating data are divided into predetermined units and inserted into assigned positions before being transmitted in order.

9. A device for updating application software in a digital broadcasting signal receiver, comprising:
    a program specific information/service information extracting section configured for extracting program specific information/service information (PSI/SI) from a received digital broadcasting signal; and
    an updating data extracting section configured for extracting an updating information for partially updating a first plurality of structural elements included in executing data for executing the application software from the PSI/SI and for extracting an updating data for updating the application software from the received digital broadcasting signal according to the updating information to update a second plurality of the first plurality of structural elements of the executing data to generate updated executing data, wherein the second plurality is less than the first plurality,
    wherein the updating data are data according to a digital storage media-command and a control (DSM-CC) protocol, and
    wherein the updating information includes an insertion position information of the updating data in the received digital broadcasting signal.

10. The device as claimed in claim 9, further comprising a memory that stores the executing data for executing the application software, the application software producing a user interface of the digital broadcasting signal receiver.

11. The device according to claim 10, further comprising an application software section configured for updating and executing the application software according to the updated executing data.

12. A method for updating an application software in a digital broadcasting signal receiver, the method comprising:
    extracting, by a program specific information/service information extracting section, program specific information/service information (PSI/SI) from a received digital broadcasting signal;

extracting, by an updating data extracting section, from the PSI/SI an updating information for partially updating a first plurality of structural elements included in executing data for executing the application software; and
extracting an updating data for updating the application software from the received digital broadcasting signal according to the updating information to update a second plurality of the first plurality of structural elements of the executing data to generate updated executing data wherein the second plurality is less than the first plurality, wherein the updating data are data according to a digital storage media-command and a control (DSM-CC) protocol, and wherein the updating information includes an insertion position information of the updating data in the received digital broadcasting signal.

13. The method according to claim 12, further comprising updating and executing the application software according to the updated executing data.

* * * * *